United States Patent
Bradley

(10) Patent No.: US 10,755,009 B1
(45) Date of Patent: Aug. 25, 2020

(54) OPTIMIZATION AFTER ALLOCATING POTENTIAL SLACKS TO CLOCK ARRIVAL TIMES

(71) Applicant: Synopsys, Inc., Mountain View, CA (US)

(72) Inventor: Danny Bradley, Austin, TX (US)

(*) Notice: Subject to any disclaimer, the term of this patent is extended or adjusted under 35 U.S.C. 154(b) by 120 days.

(21) Appl. No.: 15/957,710

(22) Filed: Apr. 19, 2018

Related U.S. Application Data

(60) Provisional application No. 62/487,853, filed on Apr. 20, 2017.

(51) Int. Cl.
| | |
|---|---|
| G06F 17/50 | (2006.01) |
| G06F 30/3312 | (2020.01) |
| G06F 30/327 | (2020.01) |
| G06F 30/337 | (2020.01) |
| G06F 30/396 | (2020.01) |
| G06F 119/12 | (2020.01) |
| G06F 30/398 | (2020.01) |

(52) U.S. Cl.
CPC ........ *G06F 30/3312* (2020.01); *G06F 30/327* (2020.01); *G06F 30/337* (2020.01); *G06F 30/396* (2020.01); *G06F 30/398* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 7,036,100 | B2* | 4/2006 | Tyler | G06F 17/5031 716/108 |
| 7,155,692 | B2* | 12/2006 | Tyler | G06F 17/5031 716/113 |
| 7,207,020 | B1* | 4/2007 | Fung | G06F 17/5054 716/113 |
| 7,831,945 | B2* | 11/2010 | Barnes | G06F 17/5068 716/113 |
| 7,836,418 | B2 | 11/2010 | Binder et al. | |
| 8,141,018 | B1* | 3/2012 | Guzy | G06F 17/5054 716/113 |
| 8,255,860 | B1* | 8/2012 | Fung | G06F 17/505 716/108 |
| 8,336,012 | B2 | 12/2012 | Fry et al. | |
| 8,443,334 | B1* | 5/2013 | Guzy | G06F 17/5054 716/113 |

(Continued)

OTHER PUBLICATIONS

C. Chen et al., "Potential Slack: An Effective Metric of Combinatorial Circuit Performance," 2000 IEEE, pp. 198-201. (Year: 2000).*

(Continued)

*Primary Examiner* — Leigh M Garbowski

(74) *Attorney, Agent, or Firm* — Park, Vaughan, Fleming & Dowler LLP; Laxman Sahasrabuddhe

(57) ABSTRACT

During logic synthesis and placement optimization, designs are aggressively optimized for timing, power, and area but only the data paths are modified and the clock network is assumed to be "ideal" and fixed. The described embodiments optimize the clock network as well as the data path logic during the logic synthesis and placement optimization stages, thereby improving the overall performance of the design.

18 Claims, 9 Drawing Sheets

(56) References Cited

U.S. PATENT DOCUMENTS 8,572,530 B1 * 10/2013 Fung .................. G06F 17/5054
716/100
9,571,074 B2 2/2017 Chowdhury et al.

OTHER PUBLICATIONS

C. Chen et al., "predicting Potential Performance for Digital Circuits," IEEE Trans. on Computer-Aided Design of Integrated Circuits and Systems, vol. 21, No. 3, Mar. 2002, pp. 253-262. (Year: 2002).*
K. Wang et al., "Potential Slack Budgeting with Clock Skew Optimization," Proc. of the IEEE Int'l Conference on Computer Design (ICCD'04), 2004 IEEE Computer Society, 7 pages. (Year: 2004).*
K. Wang et al., "ExtensiveSlackBalance: an Approach to Make Front-end Tools Aware of Clock Skew Scheduling," ACM/DAC 2006, pp. 951-954. (Year: 2006).*
H. Seo et al., "Clock Skew Optimization for Maximizing Time Margin by Utilizing Flexible Flip-Flop Timing," 16th Int'l Symposium on Quality Electronic Design, 2015 IEEE, 5 pages. (Year: 2015).*

* cited by examiner

OPTIMIZATION AFTER ALLOCATING POTENTIAL SLACKS TO CLOCK ARRIVAL TIMES

RELATED APPLICATION

This application claims priority to U.S. Provisional Application Ser. No. 62/487,853, by the same inventor, filed on 20 Apr. 2017, having the contents of which are herein incorporated by reference in their entirety.

BACKGROUND

Technical Field

This disclosure relates to optimization. More specifically, this disclosure relates to techniques and systems for performing optimization after allocating potential slacks to clock arrival times.

Related Art

Advances in process technology and an almost unlimited appetite for consumer electronics have fueled a rapid increase in the size and complexity of integrated circuit (IC) designs. The performance of tools that are used to create IC designs is very important because it reduces the time to market for IC designs. Circuit optimization and clock tree synthesis, which are important steps while designing ICs, involve creating an IC design that meets a set of timing constraints, and at the same time optimizes one or more metrics, such as area, leakage power, etc.

Unfortunately, due to the rapid increase in the size and complexity of IC designs, and the stringent timing, area, and power budgets that are imposed on the IC designs, conventional circuit optimization techniques and clock tree synthesis techniques often take a very long time to complete and/or produce poor quality results. Therefore, what are needed are systems and techniques for circuit optimization and clock tree synthesis that do not have the above-mentioned drawbacks.

SUMMARY

During logic synthesis and placement optimization, designs are aggressively optimized for timing, power, & area but only the data paths are modified and the clock network is assumed to be "ideal" and fixed. In practice, during clock tree synthesis, the clock arrival times of sequential cells are also often optimized to meet timing performance goals. By optimizing the clock network as well as the data path logic during the logic synthesis and placement optimization stages, the overall performance of the design can be improved.

Current solutions to optimize clock arrival times at sequential cells, analyze the timing of the design after the data paths have already been optimized. When a sequential cell meets its timing goal, data path optimization will then recover leakage power and area and by using up any positive slack available. This often makes the sequential cells look much more timing critical than they could potentially be. When optimizing clock arrival times on sequential cells, current solutions are limited by the amount of positive slack available when analyzing the current state of the design and do not consider any "potential slack". This will limit the range of possibilities resulting in a less optimal optimization of the logic either side of the sequential cell.

Making changes to clock arrival times of sequential cells can have a significant negative effect on clock tree complexity and hold timing. If the impact on clock tree is not considered carefully, the result can be a large increase in area and dynamic power in the clock network. The hold timing must also be carefully controlled or many new hold violations can be introduced which will increase the overall design area and power.

In summary, embodiments disclosed herein optimize the clock network at the logic synthesis and placement optimization stages to improve the overall design performance by taking advantage of available "potential slack."

In some embodiments, the following operations are performed for each sequential cell in a set of sequential cells in the IC design: (1) determining potential setup-timing-slacks that can be achieved by optimizing cells in (a) timing paths that begin at the sequential cell and (b) timing paths that end at the sequential cell, (2) determining a first setup-timing-slack that is a worst setup-timing-slack across all timing paths that end at the sequential cell, (3) determining a second setup-timing-slack that is a worst setup-timing-slack across all timing paths that begin at the sequential cell, (4) determining a clock skew based on the potential setup-timing-slacks, the first setup-timing-slack, and the second setup-timing-slack, and (5) applying the clock skew to a clock pin of the sequential cell, thereby allocating the potential setup-timing-slacks between (a) timing paths that end at the sequential cell and (b) timing paths that begin at the sequential cell. Next, the IC design is optimized to obtain an optimized IC design, wherein allocating the potential setup-timing-slack before optimizing the IC design improves optimization of the IC design. The optimized IC design is then provided to a next step in an IC design and manufacturing process which, when completed, results in an IC chip that contains the optimized IC design.

In some embodiments, the set of sequential cells comprises all sequential cells in the IC design that are not being used for clock gating. In some embodiments, determining the clock skew comprises balancing an allocation of potential setup-timing-slacks between (a) timing paths that end at the sequential cell and (b) timing paths that begin at the sequential cell. In some embodiments, after optimizing the IC design to obtain the optimized IC design, the embodiment can further perform the following operations: (1) removing clock skews from sequential cells that have positive setup-timing-slacks on all timing paths that end at the sequential cells; (2) creating clock skew goals based on remaining clock skews; and (3) performing clock tree synthesis on the optimized IC design based on the clock skew goals. In some embodiments, multiple sequential cells are treated as a single sequential cell when the multiple sequential cells are driven by a clock gating cell that has a fan-out that is less than a threshold value. In some embodiments, determining the clock skew comprises ensuring that the clock skew does not worsen a hold-timing-slack by more than a threshold value.

DETAILED DESCRIPTION

Figure 1:
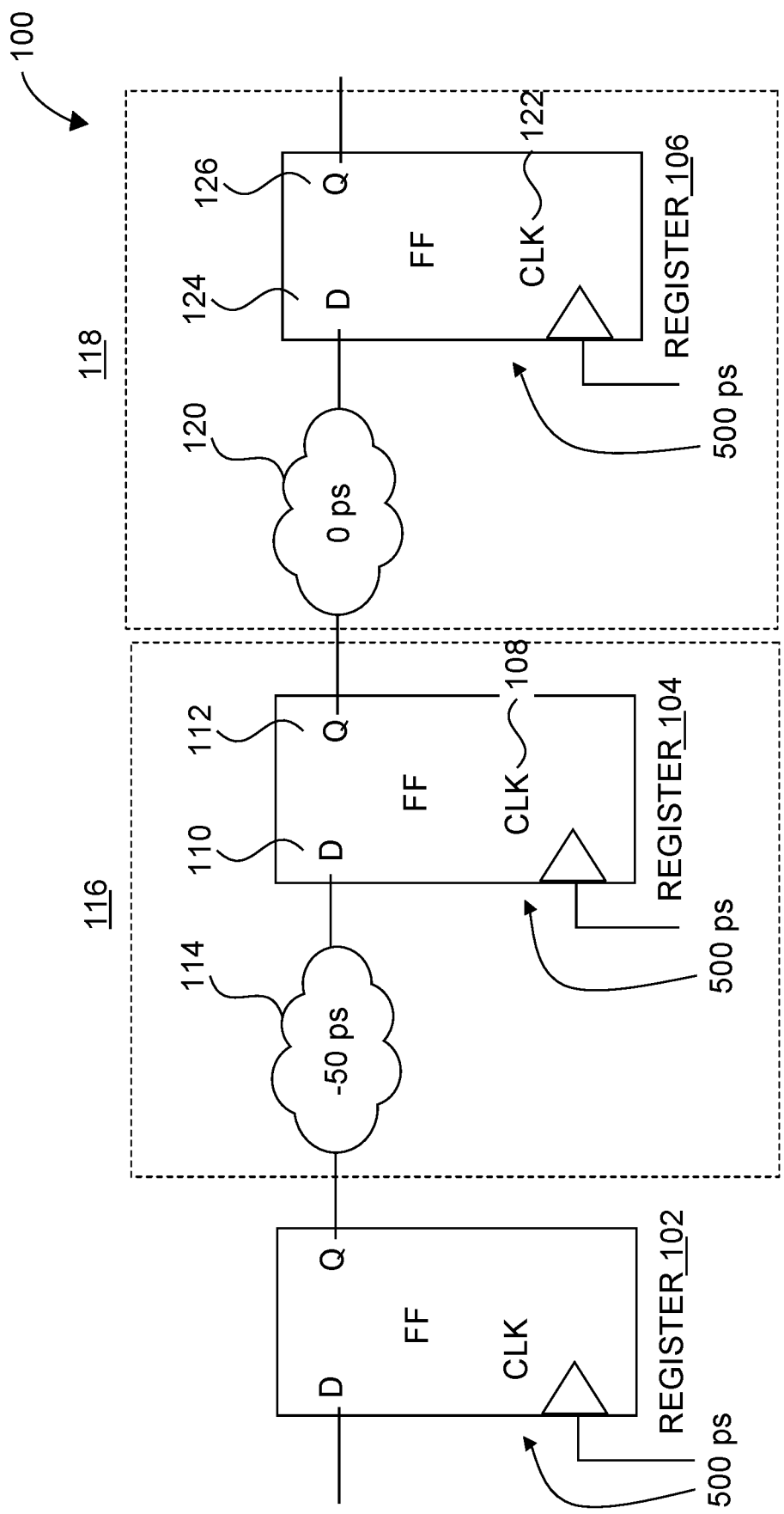
FIG. 1 illustrates an embodiment of a data path logic 100.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

IC Design and Manufacturing Process

IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the hardware description language (HDL), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. Some embodiments described herein can be used in this stage, i.e., during synthesis and design for test. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

"Clock Tree Synthesis (CTS)" in this disclosure refers to process which makes sure that the clock gets distributed evenly to all sequential elements in a design. The goal of CTS is to minimize the skew and latency. The placement data will be given as input for CTS, along with the clock tree constraints. The clock tree constraints will be Latency, Skew, Maximum transition, Maximum capacitance, Maximum fan-out, list of buffers and inverters etc. The clock tree synthesis contains clock tree building and clock tree balancing. Clock tree can be built by clock tree inverters so as to maintain the exact transition (duty cycle) and clock tree balancing is done by clock tree buffers (CTB) to meet the skew and latency requirements. Less clock tree inverters and buffers should be used to meet the area and power constraints.

"Sequential bank" in this disclosure refers to a grouping of sequential cells identified as a being driven by driving cell performing below a predefined limit. The sequential bank analyzed as if it were a single sequential cell with a single start and end worst negative slack (WNS) value. A sequential bank may also be referred to as a sequential cell in this disclosure where it is clear that we are talking about multiple sequential registers or flip-flops.

"Slack" in this disclosure refers to a difference between the required time and the arrival time for connections to a node. A positive slack s at some node implies that the arrival time at that node may be increased by s, without affecting the overall delay of the circuit. Conversely, negative slack implies that a path is too slow, and the path must be sped up (or the reference signal delayed) if the whole circuit is to work at the desired speed.

"Worst setup worst negative slack (WNS)" or "worst setup-timing-slack" in this disclosure refers to the slack of the path with slowest connection time to a sequential cell or sequential bank in a collection of sequential elements. The timing path with the worst setup-timing-slack may be identified to all start-points on the sequential cell or sequential bank and from all end points on the sequential cell or sequential bank.

Optimization after Allocating Potential Slacks to Clock Arrival Times

In some embodiments, a method of allocating potential slack in clock arrival times of sequential elements involves creating a collection of all the sequential elements in a circuit design; removing integrated clock gating cells from the collection; analyzing all paths in the design to determine their potential slack; iterating through each sequential cell in the collection; identifying the cell driving the clock pin for each sequential element; analyzing timing to determine the worst setup worst negative slack (WNS) path to all of the start-points on the sequential elements; allocating available positive slack between the start-point & end-point paths of the sequential elements; executing potential slack estimation algorithm before optimization and prior to clock tree synthesis (CTS); translating potential slack allocation into CTS optimization goals, if the potential slack estimation algorithm invocation is for pre-CTS analysis; and applying translated potential slack allocations into clock arrival times to ideal clock for each sequential element.

A prototype of this flow was implemented on a digital block of approximately 0.5 million placeable instances using a modern Finfet technology library. The baseline flow for this design had already been highly tuned to reduce leakage power during synthesis & Place & Route. The power, performance & area benefits seen on this design after completing the it through to post route step were as follows: (a) 16.25% additional reduction in Leakage Power post-route, (b) Total Negative slack (TNS) reduced from −7.6 ns to −1.5 ns post-route, and (c) 2.7% reduction in Std cell Area post-route.

In order to be able to perform a reasonably accurate analysis of setup timing, it is assumed that the data path logic has already been optimized for setup timing, power and area. For the prototype flow, this optimization step was the initial register transfer level (RTL) to gates synthesis step. However, a more optimal solution may be arrived at by moving the analysis and slack allocation step earlier in the flow to take advantage of the high level optimization techniques used earlier in the RTL to gates synthesis flow. Once an optimized design is available this can then be analyzed to determine; firstly, what "potential slack" is available in the design and secondly, if this can be allocated to paths either side of a sequential cell. FIG. 1 demonstrates an example of this type analysis & slack allocation.

Referencing FIG. 1, data path logic 100 includes a register 102, sequential cell 116, and sequential cell 118. The sequential cell 116 includes a cloud of combinational logic 114 and register 104 with clock pin CLK pin 108, D pin 110, and Q pin 112. The sequential cell 118 includes a cloud of combinational logic 120 and register 106 that includes CLK 122, D pin 124, and Q pin 126.

Referencing sequential cell 116 in FIG. 1, there is a −50 picosecond (ps) setup timing violation at the D input (D pin 110) of the sequential cell 116. However, using existing clock arrival time optimization techniques the clock arrival time at the CLK pin 108 could not be postponed to improve timing as this would create a new timing violation on the D pin 124 of the sequential cell 118.

Figure 2:
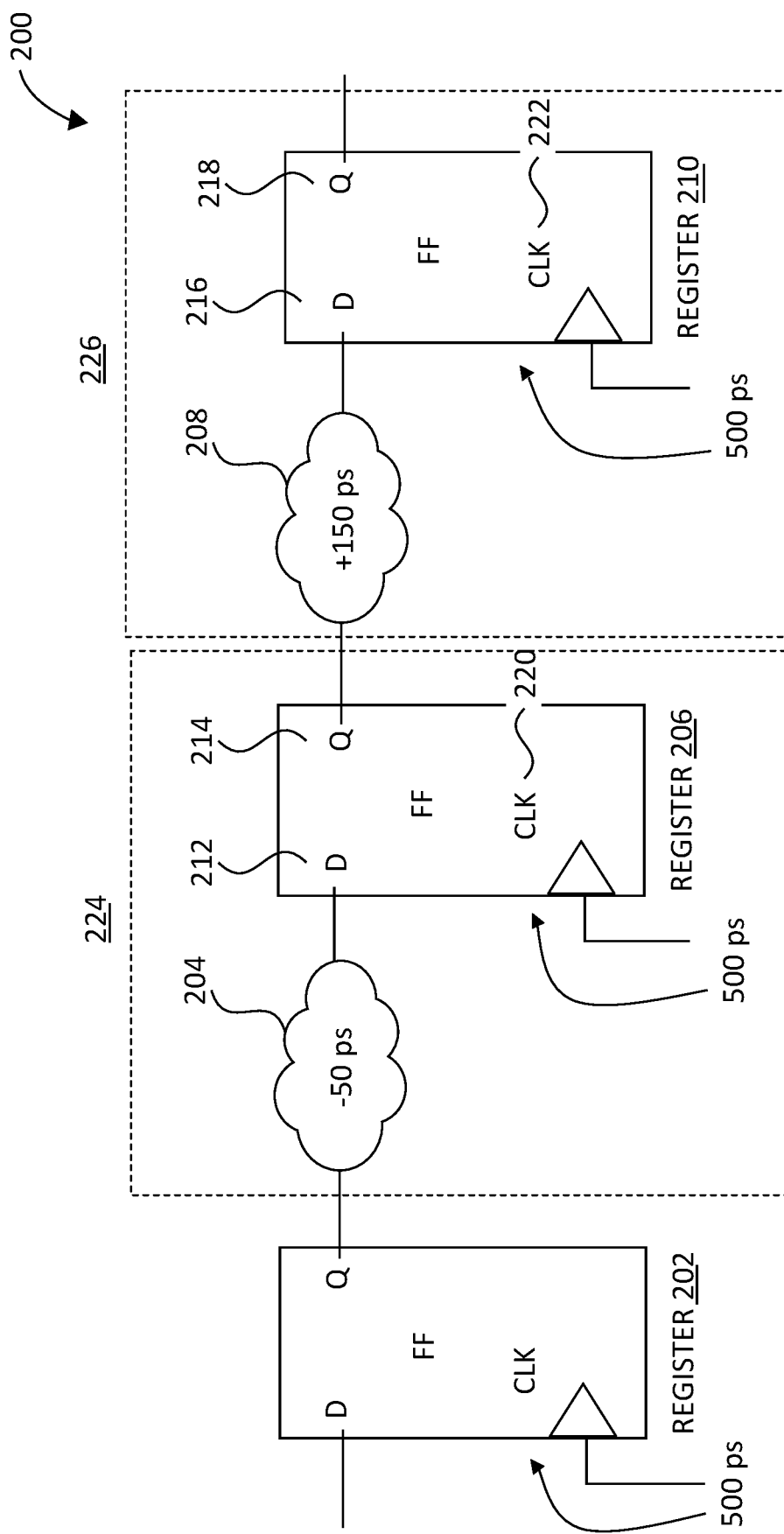
FIG. 2 illustrates an embodiment of a data path logic 200.

Referencing FIG. 2, a data path logic 200 includes a register 202, sequential cell 224, and sequential cell 226. The sequential cell 224 includes a cloud of combinational logic 204 and register 206. The register 206 includes a D pin 212, a Q pin 214, and a CLK pin 220. The sequential cell 226 includes a cloud of combinational logic 208 and register 206. The register 206 include a D pin 216, a Q pin 218, and a CLK pin 222.

In FIG. 2, analysis has been performed on the cloud of combinational logic 208 which has identified that it is possible to improve setup timing by 150 ps. This is entirely possible as this design was originally optimized for timing power & area in the initial RTL to gates synthesis step which may have sized many cells to improve power and area. Now that the analysis has revealed that there is "positive slack" available, it is possibility to optimize the clock arrival time at the CLK pin 220.

Figure 3:
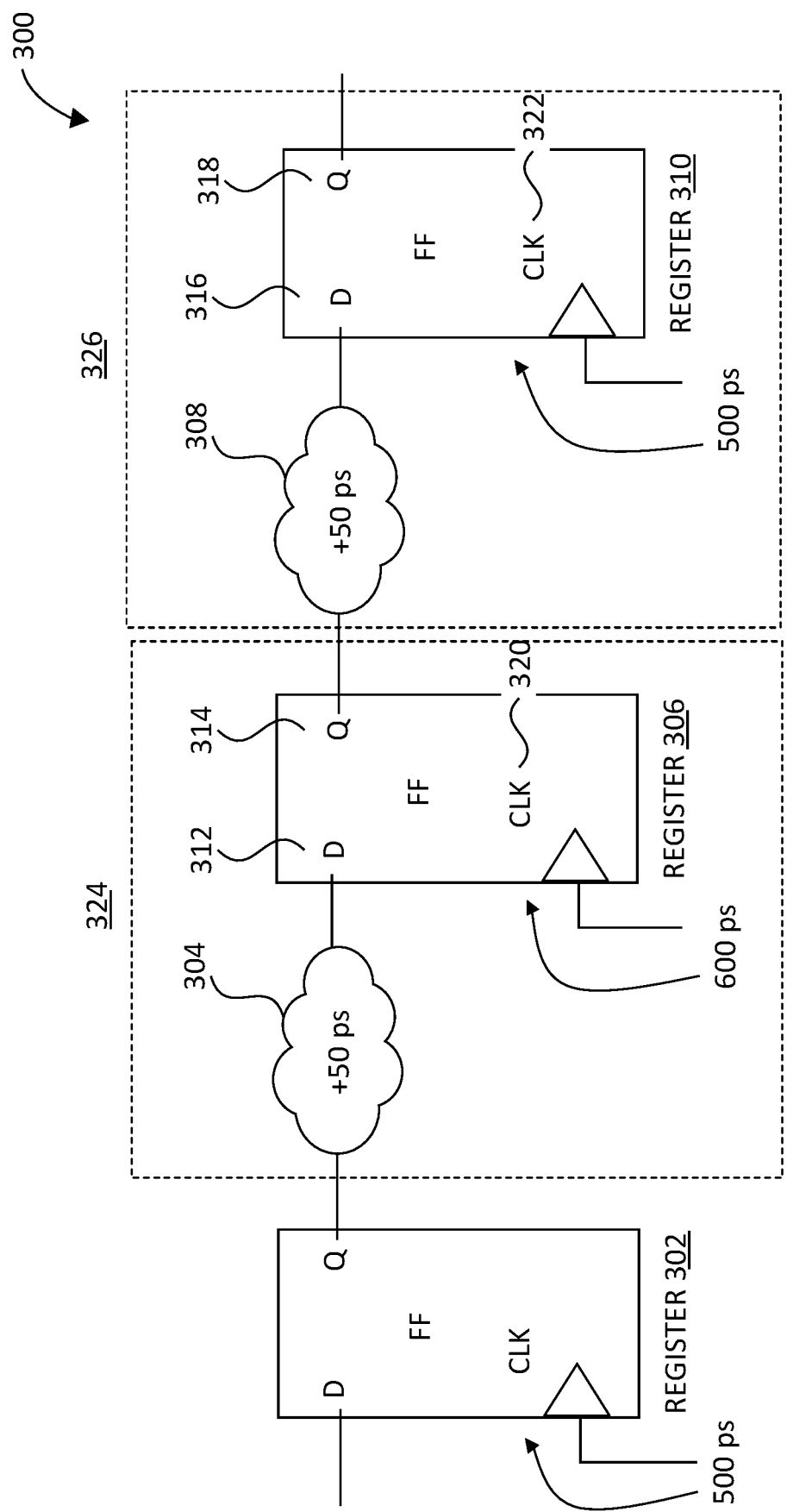
FIG. 3 illustrates an embodiment of a data path logic 300.

Referencing FIG. 3, a data path logic 300 includes a register 302, a sequential cell 324, and a sequential cell 326. The sequential cell 324 includes a cloud of combinational logic 304 and a register 306. The register 306 includes a D pin 312, a Q pin 314, and a CLK pin 320. The sequential cell 326 includes a cloud of combinational logic 308 and a register 310. The register 310 includes a D pin 316, a Q pin 318, and a CLK pin 322.

In FIG. 3, by postponing the CLK pin 320 by 100 ps, the cloud of combinational logic 304 now has 50 ps of positive slack and the cloud of combinational logic 308 still has a "potential slack" of 50 ps.

This example demonstrates how by exploring the "potential slack" available on all paths in the design, new clock arrival time optimization solution space is revealed to the optimization algorithm. This enables a more optimal allocation of the positive slack on either side of the sequential cells. This can result in improvements to timing as in this example but, moreover, it enables a more optimal optimization for power and area of the combinational logic in the green and orange clouds. Performing this type of "potential slack" analysis and allocation for all paths in the design can have a significant improvement in overall power and area.

To manage the impact of changing the clock arrival times on power and area during Clock Tree Synthesis (CTS), the algorithm which allocates the slack must consider the topology of the clock network immediately before the sequential cell. Modern digital designs will have clock gates inserted manually and by Logic Synthesis tools.

Figure 4:
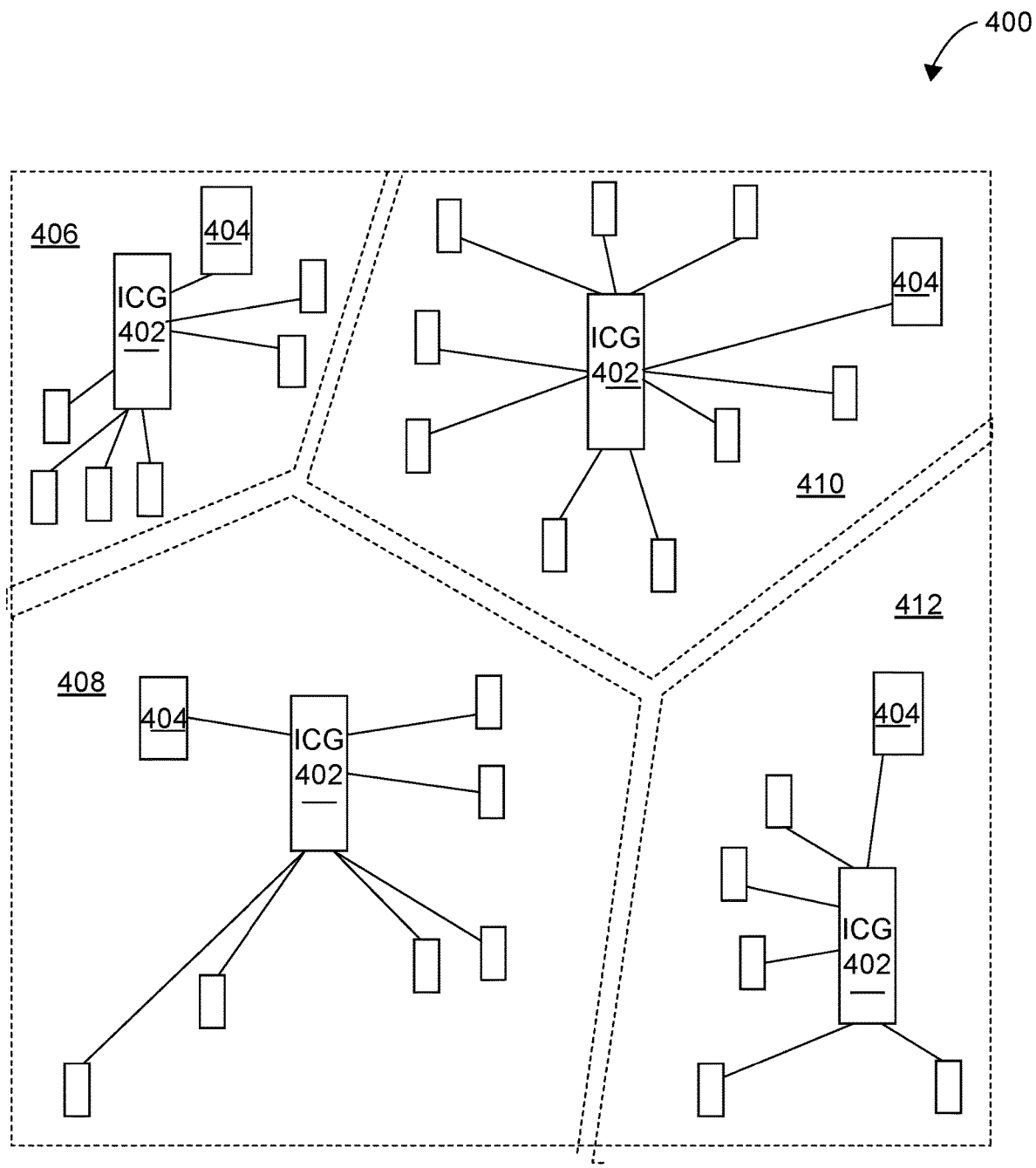
FIG. 4 illustrates an embodiment of post-CTS digital standard cell block 400 with Integrated Clock Gates (ICGs) placed in the center of mass of the registers which they drive.

Referencing FIG. 4, a post-CTS digital standard cell block 400 includes cell block 406, cell block 408, cell block 410, and cell block 412, with each including an ICG 402, and a plurality of register 404.

FIG. 4 represents a post-CTS digital standard cell block with ICGs placed in the center of mass of the registers which they drive. This illustrates a common practice of using ICGs as leaf level cells of the clock tree. If individual registers are skewed during the "potential slack" allocation, the clock tree synthesis optimization will need to introduce delay in the form on new buffers in order to realize the desired skew values.

Figure 5:
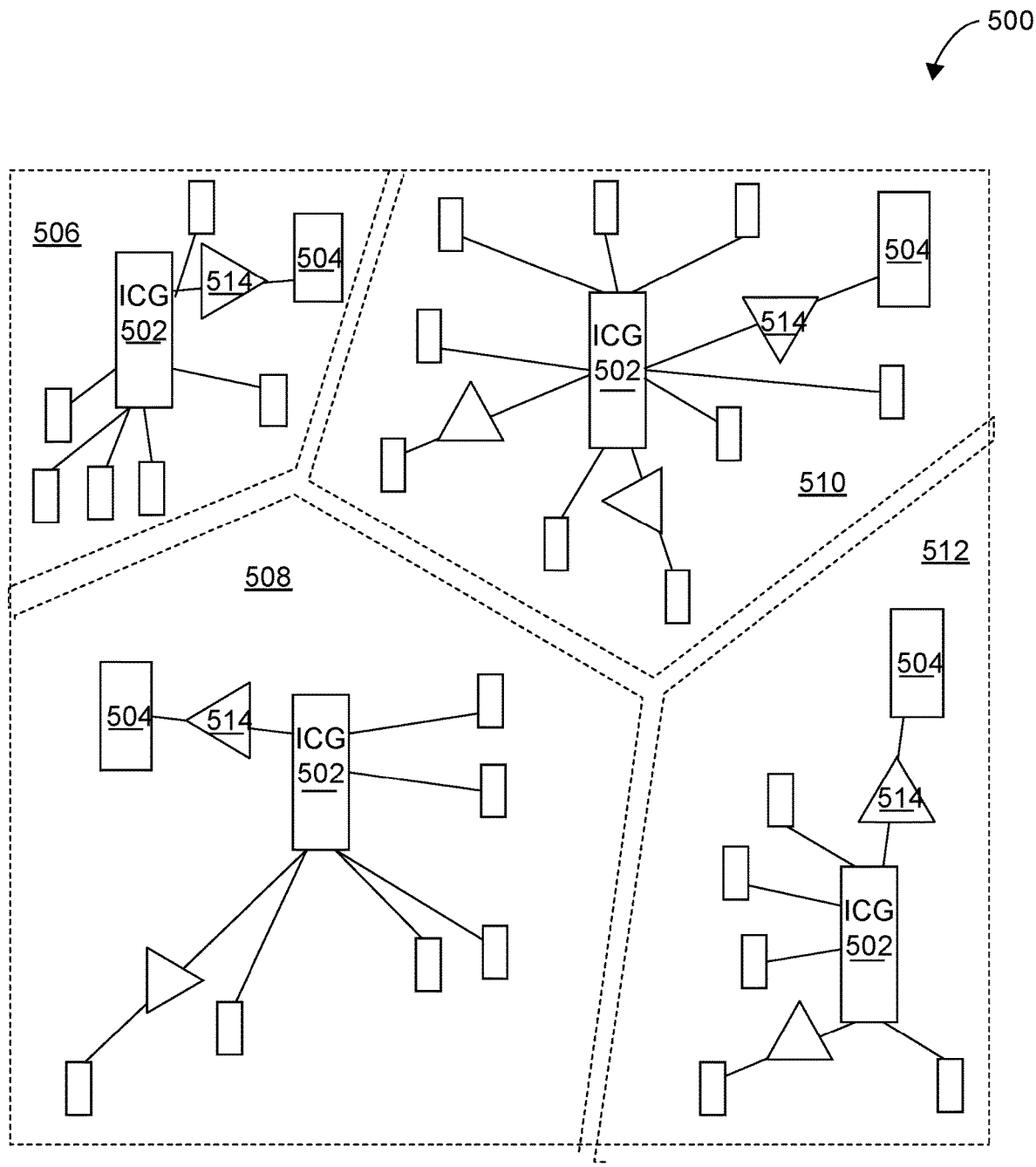
FIG. 5 illustrates an embodiment of a post-CTS digital standard cell block 500 with ICGs placed in the center of mass of the registers which they drive.

Referencing FIG. 5, a post-CTS digital standard cell block 500 includes cell block 506, cell block 508, cell block 510, and cell block 512. The cell block 506, the cell block 508, the cell block 510, and the cell block 512 each include an ICG 502 driving a plurality of registers, and register 504 with a buffer 514.

FIG. 5 shows an example of register 504 which have been postponed requiring additional buffer 514 to meet this requirement. This situation is very undesirable as there will be many thousands of ICGs in a modern digital block causing a significant increase in the number of buffers being added into the clock tree. This will increase clock tree latency, power and area, all of which will degrade the overall performance of the design.

To minimize this impact on the clock tree, the slack allocation algorithm should be aware of the clock topology and if the ICG fanout is below a defined threshold, all sequential cells being driven by the ICG should be allocated with the same clock arrival time. Doing this will drastically reduce the requirement for additional buffering to meet the arrival time targets and minimize the negative effect on the clock tree.

One other technique for reducing the impact on the clock tree is to only skew the sequential cells which could have a potential benefit for reducing area and power. For example, if there is significant positive slack on either side of a sequential cell then it is likely the combinational logic on either side of it has already been optimized as much as possible for power and area. In this case the sequential cell should not be skewed which will again minimize any negative impact on the clock tree.

To manage the impact of changing the clock arrival times on hold timing violations, the algorithm which allocates the slack must first check to ensure the hold violations are not made significantly worse before allocating the clock arrival time. To perform this analysis, it is necessary to include the hold timing extraction corner(s) at the RTL synthesis stage.

Figure 6A:
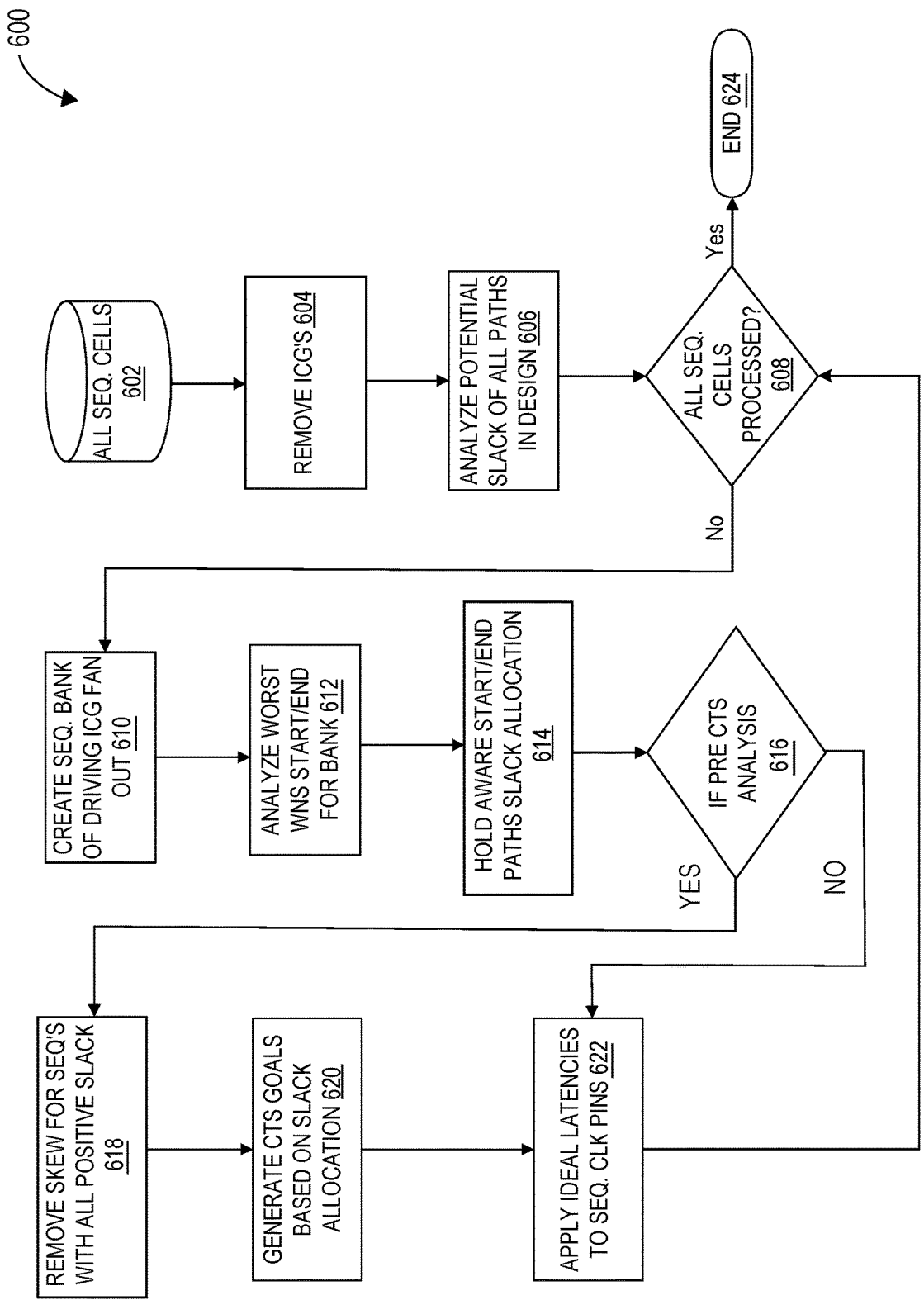
FIG. 6A illustrates a flow diagram to help explain an implementation of potential setup-timing-slack allocation 600.

Referencing FIG. 6A, an implementation of potential slack clock arrival allocation 600 creates a collection of all the sequential elements in the design (block 602). In block 604, the implementation of potential slack clock arrival allocation 600, removes the ICG cells, from the collection created in block 602. A flow could be envisaged which also includes the ICG cells but their presence will add additional complexity to the algorithm so for the purposes of this explanation they will not be considered to be part of the sequential cell list.

In block 606, the implementation of potential slack clock arrival allocation 600 analyzes all paths in the design to determine their "potential slack". This involves analyzing if the cells in all timing paths were optimized for setup timing, how much positive "potential slack" would exist on each path. For practical purposes during the CTS step, the amount of skew being applied needs to be limited. It is only necessary to analyze if "potential slack" exists up to this limit. For all subsequent steps in this algorithm, the "potential slack" timing will be used.

In decision block 608, the implementation of potential slack clock arrival allocation 600 iterates through each sequential cell in the collection. In block 610, the implementation of potential slack clock arrival allocation 600 creates a sequential bank of driving ICG fanout. For each sequential element, the cell driving their clock pin is first identified. If the fanout of this driving cell is below a predefined limit, all the cells being driven by it are grouped into a sequential bank of registers. For subsequent analysis steps this sequential bank will be analyzed as if it were a single sequential cell with a single start and end WNS value. If the fanout of the ICG is above the predefined limit, then each sequential cell is analyzed individually.

In block 612, the implementation of potential slack clock arrival allocation 600 analyzes timing to determine the worst setup WNS path to all of the start-points on the sequential cell or sequential bank. Repeat this analysis for all the end-points on the sequential cell or sequential bank.

In block 614, the implementation of potential slack clock arrival allocation 600 holds aware start/end paths for the slack allocation. The implementation of potential slack clock arrival allocation 600 allocate available potential slack between the start-point & end-point paths of the sequential cell or sequential bank. If it is a sequential bank, all sequential cells in the bank are allocated with the same clock arrival time. The positive slack allocation process needs to be hold aware. Allocating the positive slack should not significantly introduce or increase hold violations.

In decision block 616, the implementation of potential slack clock arrival allocation 600 determines if pre-CTS analysis. The "Potential slack Estimation Algorithm" will be executed initially before optimization to allocate positive slack which can be used during the subsequent optimization.

In block 618, the implementation of potential slack clock arrival allocation 600 removes skew from sequential cells with all positive slack. The algorithm will be executed again just prior to CTS to revisit the slack allocation based on the new current optimization state of the design. In addition, this invocation will remove any slack allocation for sequential cells or banks which have positive slack on both sides of the sequential cell with no slack allocation present. Removing this slack allocation will help to minimize the impact on CTS.

In block 620, the implementation of potential slack clock arrival allocation 600 generates CTS goals based on slack allocation. If the algorithm invocation is for pre-CTS analysis, the "potential slack" allocation is translated into CTS optimization goals which are applied to the clock pin of each sequential cell or sequential bank which has been adjusted.

In block 622, the implementation of potential slack clock arrival allocation 600, applies ideal latencies to sequential CLK pins. Finally, the "potential slack" allocation is translated into clock arrival times which are applied to the ideal clock for each sequential cell or sequential bank which has been adjusted.

In done block 624, the implementation of potential slack clock arrival allocation 600 ends. When every sequential cell has been analyzed the algorithm terminates.

Figure 6B:
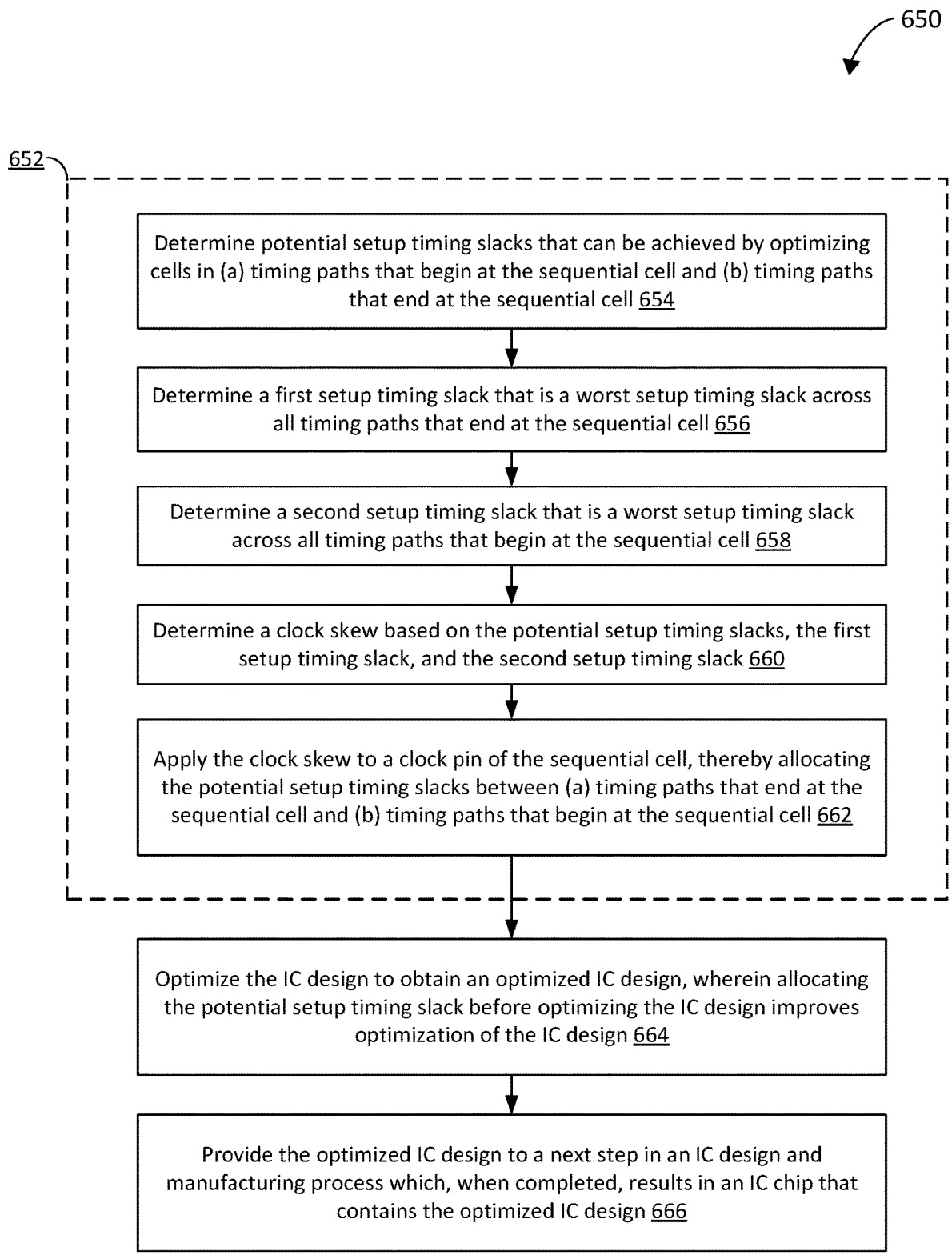
FIG. 6B illustrates a flow diagram to help explain an implementation of potential setup-timing-slack allocation 650.

Referencing FIG. 6B, for each sequential cell in a set of sequential cells, an implementation of allocating potential slacks to clock arrival times begins by performing a set of operations (block 652). In some embodiments, the set of sequential cells comprises all sequential cells in the IC design that are not being used for clock gating. In some embodiments, multiple sequential cells are treated as a single sequential cell when the multiple sequential cells are driven by a clock gating cell that has a fan-out that is less than a threshold value.

Specifically, for each sequential cell in a set of sequential cells in the IC design, the following operations (block 652) can be performed (the set of operations may or may not be performed in the same iterative loop; for example, the potential setup-timing-slacks may be computed for all sequential cells by estimating an timing slack impact of optimizing the entire IC design, and then the other operations shown in block 652 may be performed in a separate iterative loop):

Determine potential setup-timing-slacks that can be achieved by optimizing cells in (a) timing paths that begin at the sequential cell and (b) timing paths that end at the sequential cell (block 654). In some embodiments, the potential setup-timing-slacks are determined by using a fast and approximate estimation technique (as opposed to actually performing a full blown optimization).

Determine a first setup-timing-slack that is a worst setup-timing-slack across all timing paths that end at the sequential cell (block 656).

Determine a second setup-timing-slack that is a worst setup-timing-slack across all timing paths that begin at the sequential cell (block 658).

Determine a clock skew based on the potential setup-timing-slacks, the first setup-timing-slack, and the second setup-timing-slack (block 660). In some embodiments, determining the clock skew comprises balancing an allocation of potential setup-timing-slacks between (a) timing paths that end at the sequential cell and (b) timing paths that begin at the sequential cell. In some embodiments, determining the clock skew comprises ensuring that the clock skew does not worsen a hold-timing-slack by more than a threshold value.

Apply the clock skew to a clock pin of the sequential cell, thereby allocating the potential setup-timing-slacks between (a) timing paths that end at the sequential cell and (b) timing paths that begin at the sequential cell (block 662).

Next, in block 664, the IC design is optimized to obtain an optimized IC design, wherein allocating the potential setup-timing-slack before optimizing the IC design improves optimization of the IC design. Optimization of an IC design can involve operations such as cell resizing (i.e., replacing an existing cell in the IC design with a functionally equivalent cell that has different area, leakage power, timing characteristics), applying transformations (i.e., by replacing a portion of the IC design with a logically equivalent circuit), etc. In some embodiments, process 650 additionally performs the following operations: (1) remove clock skews from sequential cells that have positive setup-timing-slacks on all timing paths that end at the sequential cells, (2) create clock skew goals based on remaining clock skews, and (3) perform clock tree synthesis on the optimized IC design based on the clock skew goals.

In block 666, the optimized IC design is provided to a next step in an IC design and manufacturing process which, when completed, results in an IC chip that contains the optimized IC design.

Figure 7:
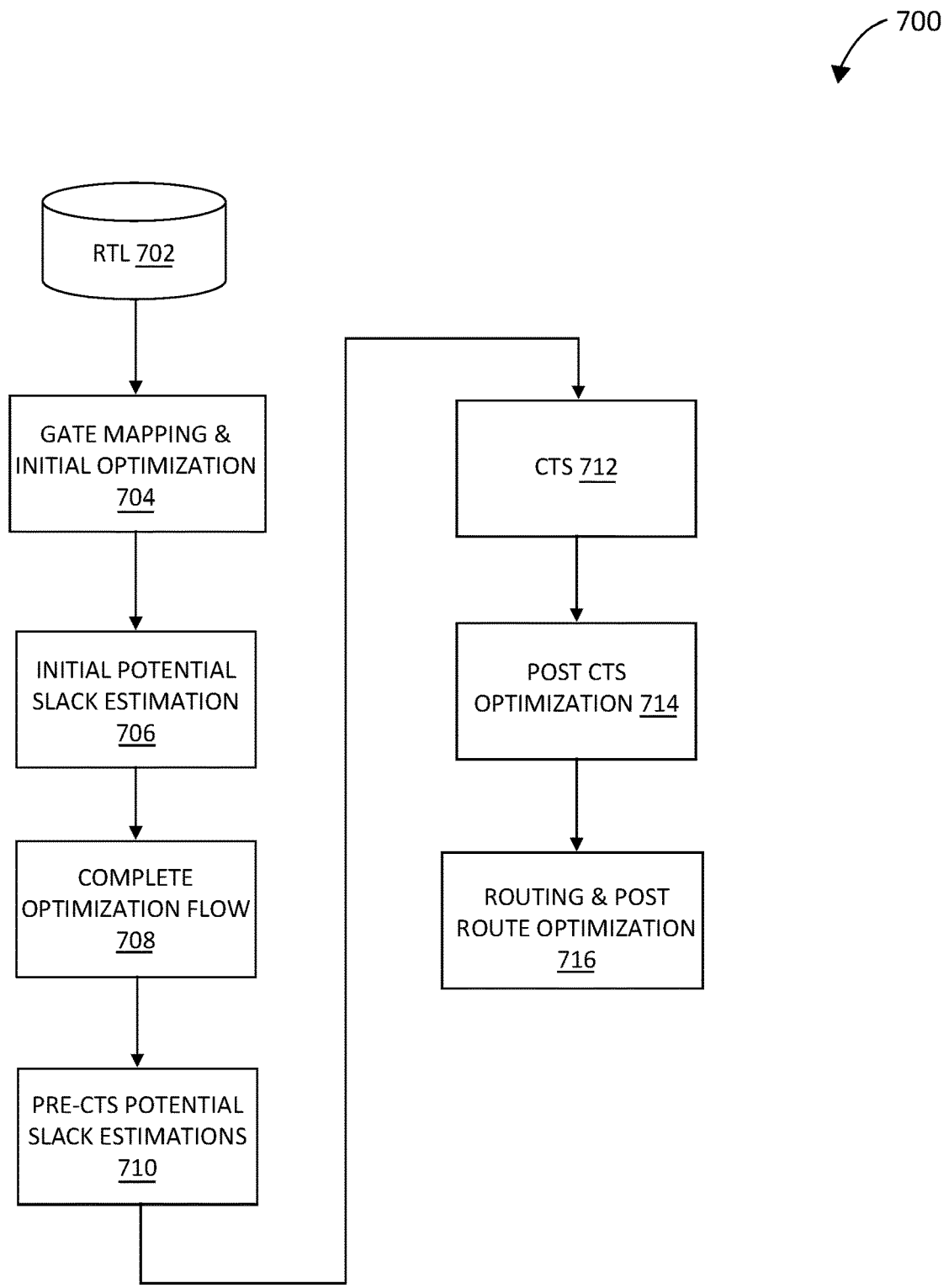
FIG. 7 illustrates a diagram of potential slack flow 700.

Referencing FIG. 7, a potential slack flow 700 involves performing an initial RTL to gates synthesis step on the design (block 702). In block 704, the potential slack flow 700 performs gate mapping and initial optimization. In block 706, the potential slack flow 700 performs an initial potential slack estimation step. In block 708, the potential slack flow 700 completes the optimization flow. In block 710, the potential slack flow 700 executes a pre-CTS potential slack estimation step. In block 712, the potential slack flow 700 operates clock tree synthesis (CTS). In block 714, the potential slack flow 700 performs post CTS optimizations. In block 716, the potential slack flow 700 performs routing and post routing optimizations.

The initial potential slack estimation step is executed after the design has been mapped and has had some initial timing, power & area optimization performed on it. It is important to have a reasonably optimized starting point design as the potential slack allocation algorithm relies on a realistic timing picture of the input netlist. The algorithm will explore what potential slack is available and allocate this in a hold aware fashion. The design is then run through to the completion of the pre-CTS optimization steps using the ideal clock arrival times calculated during the initial potential slack estimation step.

The pre-CTS potential slack estimation step is then executed and includes two additional steps to the initial potential slack estimation step. Firstly, any sequential cells or banks which have positive slack available on the start & endpoints with no slack allocation are removed from having their clock arrival time adjusted. Secondly, CTS goals are generated based on the slack allocation in order to drive the CTS engine to realize the clock arrival times modelled on the ideal clock during pre-CTS optimization. This enables the benefits seen pre-CTS to also be realized during the post-CTS optimization steps.

Figure 8:
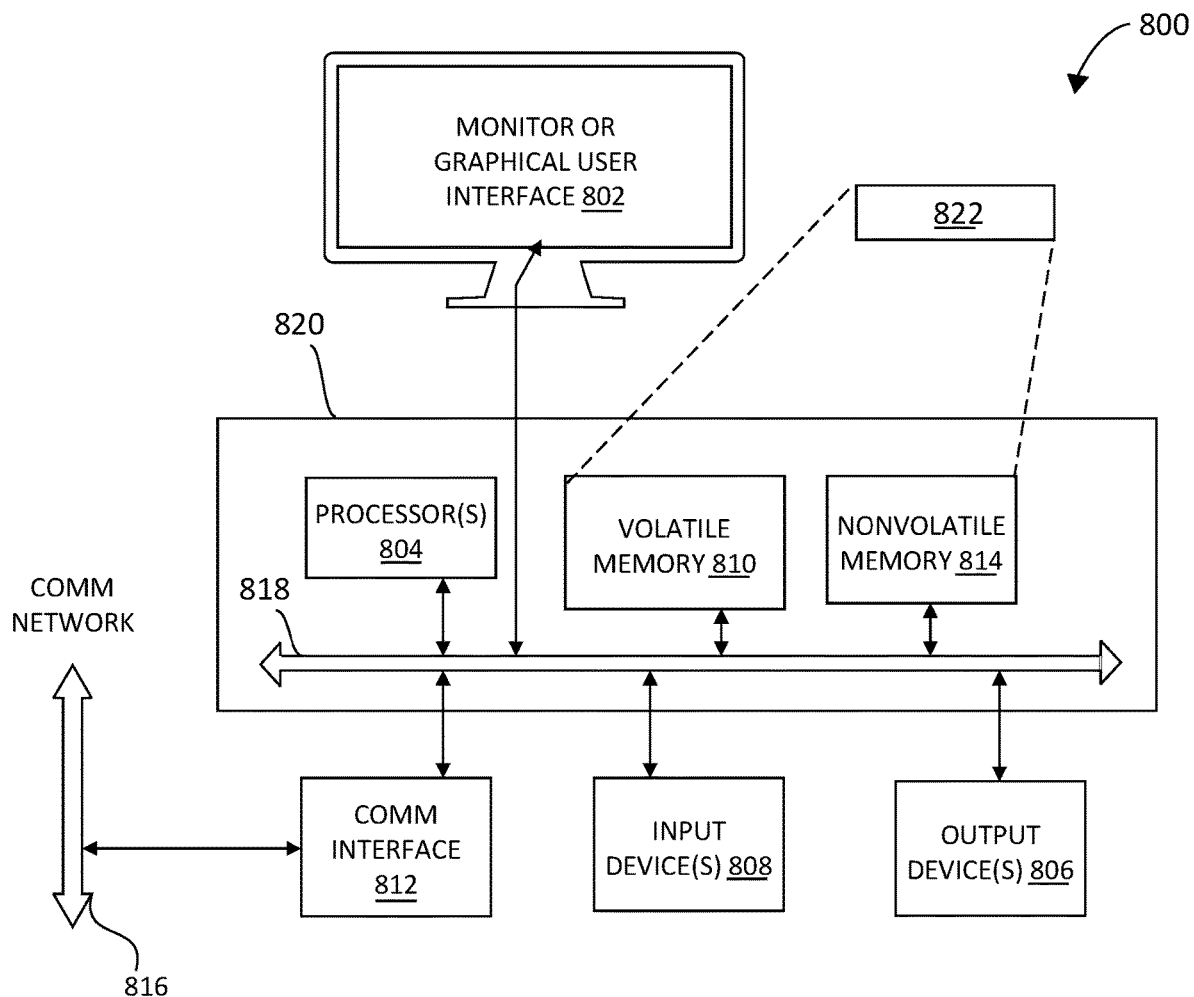
FIG. 8 is an example block diagram of a computing device 800 that may incorporate embodiments of the present invention.

FIG. 8 is an example block diagram of a computing device 800 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, the computing device 800 typically includes a monitor or graphical user interface 802, a data processing system 820, a communication network interface 812, input device(s) 808, output device(s) 806, and the like.

As depicted in FIG. 8, the data processing system 820 may include one or more processor(s) 804 that communicate with a number of peripheral devices via a bus subsystem 818. These peripheral devices may include input device(s) 808, output device(s) 806, communication network interface 812, and a storage subsystem, such as a volatile memory 810 and a nonvolatile memory 814.

The volatile memory 810 and/or the nonvolatile memory 814 may store computer-executable instructions and thus forming logic 822 that when applied to and executed by the processor(s) 804 implement embodiments of the processes disclosed herein.

The input device(s) 808 include devices and mechanisms for inputting information to the data processing system 820. These may include a keyboard, a keypad, a touch screen incorporated into the monitor or graphical user interface 802, audio input devices such as voice recognition systems, microphones, and other types of input devices. In various embodiments, the input device(s) 808 may be embodied as a computer mouse, a trackball, a track pad, a joystick, wireless remote, drawing tablet, voice command system, eye tracking system, and the like. The input device(s) 808 typically allow a user to select objects, icons, control areas, text and the like that appear on the monitor or graphical user interface 802 via a command such as a click of a button or the like.

The output device(s) 806 include devices and mechanisms for outputting information from the data processing system 820. These may include speakers, printers, infrared LEDs, and so on as well understood in the art.

The communication network interface 812 provides an interface to communication networks (e.g., communication network 816) and devices external to the data processing system 820. The communication network interface 812 may serve as an interface for receiving data from and transmitting data to other systems. Embodiments of the communication network interface 812 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 812 may be coupled to the communication network 816 via an antenna, a cable, or the like. In some embodiments, the communication network interface 812 may be physically integrated on a circuit board of the data processing system 820, or in some cases may be implemented in software or firmware, such as "soft modems", or the like.

The computing device 800 may include logic that enables communications over a network using protocols such as HTTP, TCP/IP, RTP/RTSP, IPX, UDP and the like.

The volatile memory 810 and the nonvolatile memory 814 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 810 and the nonvolatile memory 814 may be configured to store the basic programming and data constructs that provide the functionality of the disclosed processes and other embodiments thereof that fall within the scope of the present invention.

Software that implements embodiments of the present invention may be stored in the volatile memory 810 and/or the nonvolatile memory 814. Said software may be read from the volatile memory 810 and/or nonvolatile memory 814 and executed by the processor(s) 804. The volatile memory 810 and the nonvolatile memory 814 may also provide a repository for storing data used by the software.

The volatile memory 810 and the nonvolatile memory 814 may include a number of memories including a main random access memory (RAM) for storage of instructions and data during program execution and a read only memory (ROM) in which read-only non-transitory instructions are stored. The volatile memory 810 and the nonvolatile memory 814 may include a file storage subsystem providing persistent (non-volatile) storage for program and data files. The volatile memory 810 and the nonvolatile memory 814 may include removable storage systems, such as removable flash memory.

The bus subsystem 818 provides a mechanism for enabling the various components and subsystems of data processing system 820 communicate with each other as intended. Although the communication network interface 812 is depicted schematically as a single bus, some embodiments of the bus subsystem 818 may utilize multiple distinct busses.

It will be readily apparent to one of ordinary skill in the art that the computing device 800 may be a mobile device such as a smartphone, a desktop computer, a laptop computer, a rack-mounted computer system, a computer server, or a tablet computer device. As commonly known in the art, the computing device 800 may be implemented as a collection of multiple networked computing devices. Further, the computing device 800 will typically include operating system logic (not illustrated) the types and nature of which are well known in the art.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment). "Firmware" in this context refers to software logic embodied as processor-executable instructions stored in read-only memories or media. "Hardware" in this context refers to logic embodied as analog or digital circuitry. "Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times. "Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed.

If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing an integrated circuit (IC) design, the method comprising:
   for each sequential cell in a set of sequential cells in the IC design,
      estimating post-timing-optimization setup-timing-slacks that can be achieved by optimizing cells in (a) timing paths that begin at the sequential cell and (b) timing paths that end at the sequential cell, wherein the estimated post-timing-optimization setup-timing-slacks are greater than existing setup-timing-slacks,
      determining a first setup-timing-slack that is a worst setup-timing-slack across all timing paths that end at the sequential cell,
      determining a second setup-timing-slack that is a worst setup-timing-slack across all timing paths that begin at the sequential cell,
      determining a clock skew based on the estimated post-timing-optimization setup-timing-slacks, the first setup-timing-slack, and the second setup-timing-slack, and
      applying the clock skew to a clock pin of the sequential cell, thereby allocating the estimated post-timing-optimization setup-timing-slacks between the timing paths that end at the sequential cell and the timing paths that begin at the sequential cell;
   after applying clock skews to the set of sequential cells in the IC design, optimizing the IC design to obtain an optimized IC design, wherein allocating the estimated post-timing-optimization setup-timing-slack before optimizing the IC design improves optimization of the IC design; and
   providing the optimized IC design to a next step in an IC design and manufacturing process which, when completed, results in an IC chip that contains the optimized IC design.

2. The method of claim 1, wherein the set of sequential cells comprises all sequential cells in the IC design that are not being used for clock gating.

3. The method of claim 1, wherein determining the clock skew comprises balancing an allocation of estimated post-timing-optimization setup-timing-slacks between timing paths that end at the sequential cell and timing paths that begin at the sequential cell.

4. The method of claim 1, wherein after optimizing the IC design to obtain the optimized IC design, the method further comprises:
   removing clock skews from sequential cells that have positive setup-timing-slacks on all timing paths that end at the sequential cells;
   creating clock skew goals based on remaining clock skews; and
   performing clock tree synthesis on the optimized IC design based on the clock skew goals.

5. The method of claim 1, wherein multiple sequential cells are treated as a single sequential cell when the multiple sequential cells are driven by a clock gating cell that has a fan-out that is less than a threshold value.

6. The method of claim 1, wherein determining the clock skew comprises ensuring that the clock skew does not worsen a hold-timing-slack by more than a threshold value.

7. A non-transitory computer-readable storage medium storing instructions that, when executed by a computer, cause the computer to perform a method for optimizing an integrated circuit (IC) design, the method comprising:
- for each sequential cell in a set of sequential cells in the IC design,
  - estimating post-timing-optimization setup-timing-slacks that can be achieved by optimizing cells in (a) timing paths that begin at the sequential cell and (b) timing paths that end at the sequential cell, wherein the estimated post-timing-optimization setup-timing-slacks are greater than existing setup-timing-slacks,
  - determining a first setup-timing-slack that is a worst setup-timing-slack across all timing paths that end at the sequential cell,
  - determining a second setup-timing-slack that is a worst setup-timing-slack across all timing paths that begin at the sequential cell,
  - determining a clock skew based on the estimated post-timing-optimization setup-timing-slacks, the first setup-timing-slack, and the second setup-timing-slack, and
  - applying the clock skew to a clock pin of the sequential cell, thereby allocating the estimated post-timing-optimization setup-timing-slacks between timing paths that end at the sequential cell and timing paths that begin at the sequential cell;
- after applying clock skews to the set of sequential cells in the IC design, optimizing the IC design to obtain an optimized IC design, wherein allocating the estimated post-timing-optimization setup-timing-slack before optimizing the IC design improves optimization of the IC design; and
- providing the optimized IC design to a next step in an IC design and manufacturing process which, when completed, results in an IC chip that contains the optimized IC design.

8. The non-transitory computer-readable storage medium of claim 7, wherein the set of sequential cells comprises all sequential cells in the IC design that are not being used for clock gating.

9. The non-transitory computer-readable storage medium of claim 7, wherein determining the clock skew comprises balancing an allocation of estimated post-timing-optimization setup-timing-slacks between timing paths that end at the sequential cell and timing paths that begin at the sequential cell.

10. The non-transitory computer-readable storage medium of claim 7, wherein after optimizing the IC design to obtain the optimized IC design, the method further comprises:
- removing clock skews from sequential cells that have positive setup-timing-slacks on all timing paths that end at the sequential cells;
- creating clock skew goals based on remaining clock skews; and
- performing clock tree synthesis on the optimized IC design based on the clock skew goals.

11. The non-transitory computer-readable storage medium of claim 7, wherein multiple sequential cells are treated as a single sequential cell when the multiple sequential cells are driven by a clock gating cell that has a fan-out that is less than a threshold value.

12. The non-transitory computer-readable storage medium of claim 7, wherein determining the clock skew comprises ensuring that the clock skew does not worsen a hold-timing-slack by more than a threshold value.

13. An apparatus, comprising:
- a processor; and
- a non-transitory storage medium storing instructions that, when executed by the processor, cause the processor to perform a method for optimizing an integrated circuit (IC) design, the method comprising:
  - for each sequential cell in a set of sequential cells in the IC design,
    - estimating post-timing-optimization setup-timing-slacks that can be achieved by optimizing cells in (a) timing paths that begin at the sequential cell and (b) timing paths that end at the sequential cell, wherein the estimated post-timing-optimization setup-timing-slacks are greater than existing setup-timing-slacks,
    - determining a first setup-timing-slack that is a worst setup-timing-slack across all timing paths that end at the sequential cell,
    - determining a second setup-timing-slack that is a worst setup-timing-slack across all timing paths that begin at the sequential cell,
    - determining a clock skew based on the estimated post-timing-optimization setup-timing-slacks, the first setup-timing-slack, and the second setup-timing-slack, and
    - applying the clock skew to a clock pin of the sequential cell, thereby allocating the estimated post-timing-optimization setup-timing-slacks between timing paths that end at the sequential cell and timing paths that begin at the sequential cell;
  - after applying clock skews to the set of sequential cells in the IC design, optimizing the IC design to obtain an optimized IC design, wherein allocating the estimated post-timing-optimization setup-timing-slack before optimizing the IC design improves optimization of the IC design; and
  - providing the optimized IC design to a next step in an IC design and manufacturing process which, when completed, results in an IC chip that contains the optimized IC design.

14. The apparatus of claim 13, wherein the set of sequential cells comprises all sequential cells in the IC design that are not being used for clock gating.

15. The apparatus of claim 13, wherein determining the clock skew comprises balancing an allocation of estimated post-timing-optimization setup-timing-slacks between timing paths that end at the sequential cell and timing paths that begin at the sequential cell.

16. The apparatus of claim 13, wherein after optimizing the IC design to obtain the optimized IC design, the method further comprises:
- removing clock skews from sequential cells that have positive setup-timing-slacks on all timing paths that end at the sequential cells;
- creating clock skew goals based on remaining clock skews; and
- performing clock tree synthesis on the optimized IC design based on the clock skew goals.

17. The apparatus of claim 13, wherein multiple sequential cells are treated as a single sequential cell when the multiple sequential cells are driven by a clock gating cell that has a fan-out that is less than a threshold value.

18. The apparatus of claim 13, wherein determining the clock skew comprises ensuring that the clock skew does not worsen a hold-timing-slack by more than a threshold value.

\* \* \* \* \*